United States Patent [19]

Clarke

[11] 4,420,901

[45] Dec. 20, 1983

[54] IMPLEMENT FOR FLAME TREATING SOIL

[76] Inventor: Howard Y. Clarke, 315 South Dudley, Memphis, Tenn. 38104

[21] Appl. No.: 347,006

[22] Filed: Feb. 8, 1982

[51] Int. Cl.³ ............................................. A01M 15/00
[52] U.S. Cl. ...................................... 47/1.44; 47/1.42
[58] Field of Search .................... 47/1.42, 1.44; 37/71, 37/82

[56] References Cited

U.S. PATENT DOCUMENTS

| | | | |
|---|---|---|---|
| 96,824 | 11/1869 | McGehee | 37/82 |
| 754,611 | 3/1904 | Riley | 37/71 |
| 2,602,388 | 6/1952 | Elliott et al. | 47/1.42 |
| 2,858,755 | 11/1958 | Toulmin, Jr. | 47/1.42 |
| 2,966,128 | 12/1960 | Toulmin, Jr. | 47/1.42 |
| 4,034,739 | 6/1977 | Boekelman | 47/1.42 |

Primary Examiner—Robert A. Hafer
Assistant Examiner—Bradley M. Lewis
Attorney, Agent, or Firm—Walker & McKenzie

[57] ABSTRACT

A mobile implement for flame treating soil. The implement includes an elongated tube member for being pulled over the ground to be treated, a scoop for digging soil from the ground as the tube member is pulled thereover, an auger or screw for conveying the soil through the tube, and a burner for subjecting the soil being conveyed through the tube member to flame substantially along the entire length of the tube member.

10 Claims, 6 Drawing Figures

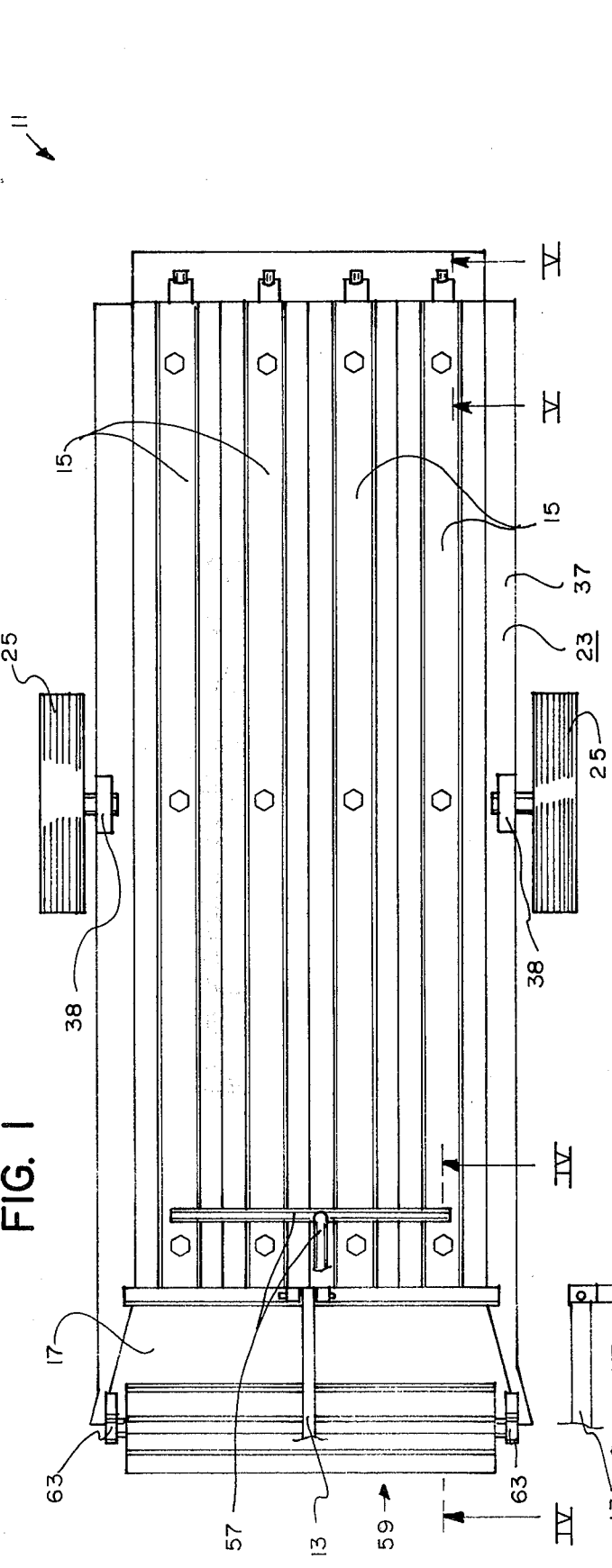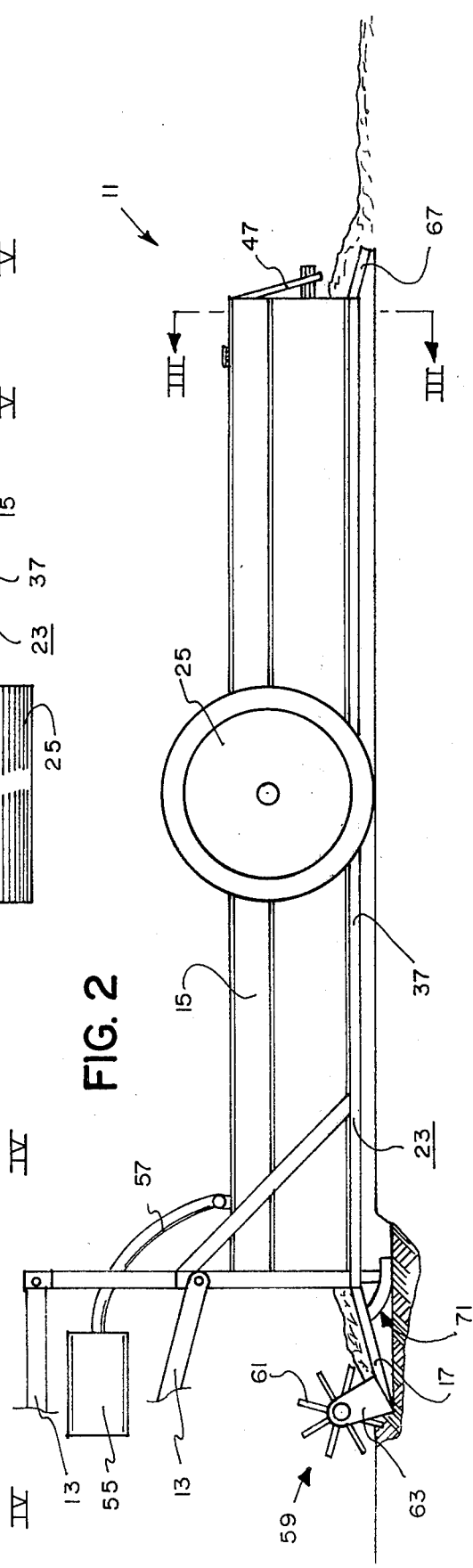

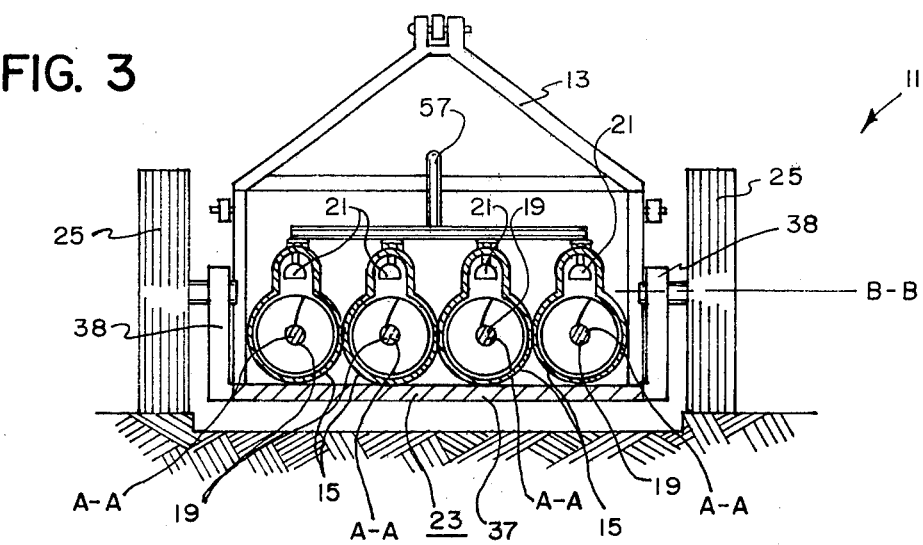
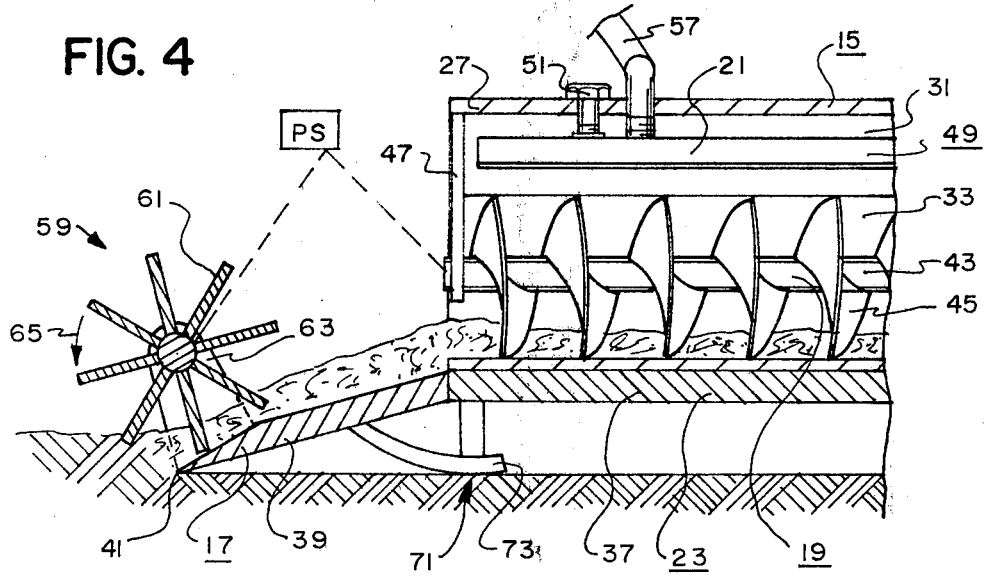
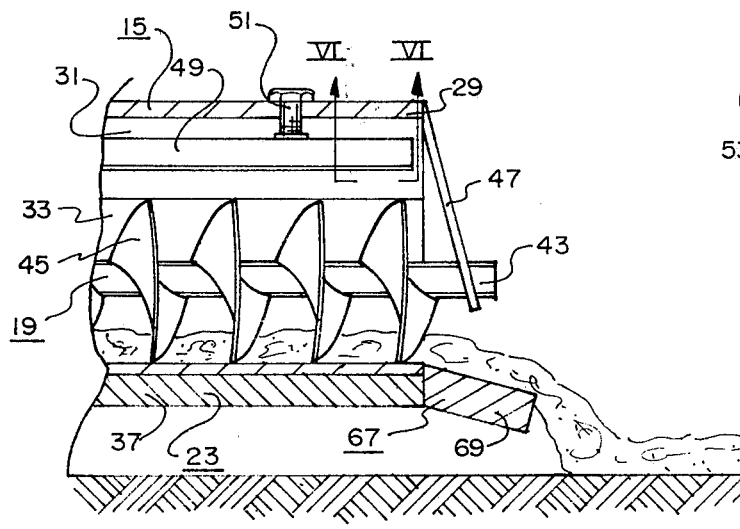
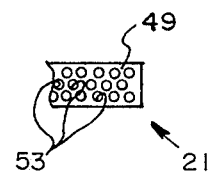

IMPLEMENT FOR FLAME TREATING SOIL

BACKGROUND OF THE INVENTION

1. Field of the Invention

The present invention relates to agricultural implements for use in treating soil to help rid the soil of unwanted insects, weeds, seeds, etc.

2. Description of the Prior Art

Various methods and implements have heretofore been developed to help rid soil of unwanted insects, nematodes, weeds, grass, seeds, etc., in an attempt to make agricultural land more productive. Woods, U.S. Pat. Nos. 2,008,891 and 2,237,775 disclose apparatuses that include knife-like plow members for being pulled through the soil. Each plow member is coupled to fuel tanks and includes burners or the like for burning the fuel to cause heat or flame to be distributed to the soil penetrated by the plow. Elliott, U.S. Pat. Nos. 2,272,190 and 2,602,388 disclose apparatuses for discharging super heated steam into soil to kill insects, weed seeds, etc. The apparatus of the U.S. Pat. No. 2,602,388 has an elongated tunnel 26, a blade 35 for digging up soil and advancing the soil into the front of the tunnel 26, a pair of oppositely rotating conveyor screws 28 within the tunnel 26 rotating at a high enough speed to break up the soil and to move the soil through the tunnel 26, and steam distributing manifolds 55, 56 extending lengthwise of the tunnel 26 above and below the coacting edges of the conveyor screws 55, 56. Toulmin, U.S. Pat. Nos. 2,755,719 and 2,858,755 disclose implements which includes disc harrows for loosening soil, scoops for picking up the loosened soil, enclosed conveyors for conveying the picked up soil to a treating chamber, and gas burner units for subjecting the soil to heat or flames within the treating chamber. MacDonald, U.S. Pat. No. 2,986,841 discloses an apparatus including a "ground peeling" deflector, a tooth drum for assisting in feeding the soil over the deflector, rotary beaters for breaking up the soil lifted by the deflector, and a flame thrower or burner to subject the broken soil to flame as the broken soil falls back to the ground. None of the above patents disclose or suggest the present invention.

SUMMARY OF THE INVENTION

The present invention is directed toward improving upon prior implements for and methods of treating soil. One objective of the present invention is to provide a relatively simple implement that can be easily pulled behind a typical tractor and that will effectively and thoroughly sterilize the upper section of the ground by subjecting the soil to flame.

The implement for flame treating soil of the present invention includes, in general, a plurality of elongated tube members, scoop means for digging soil from the ground as the implement is moved thereover and for directing the soil toward the tube members, elongated screw means for being mounted in the tube members and for causing the soil to pass completely through the tube members, and elongated burner means for being mounted in each of the tube members for subjecting the soil moving through the tube members to flame along the entire length of the tube members.

BRIEF DESCRIPTION OF THE DRAWINGS

FIG. 1 is a top plan view of the implement of the present invention with certain portions thereof broken away and showing a portion of the three-point hitch mechanism of a farm tractor.

FIG. 2 is a side elevational view thereof.

FIG. 3 is a sectional view as taken on line III—III of FIG. 2.

FIG. 4 is an enlarged sectional view as taken on line IV—IV of FIG. 1.

FIG. 5 is an enlarged sectional view as taken on line V—V of FIG. 1.

FIG. 6 is a sectional view as taken on line VI—VI of FIG. 5.

DESCRIPTION OF THE PREFERRED EMBODIMENT

The implement 11 of the present invention is adapted to be pulled behind a typical farm tractor having a three-point hitch mechanism (a portion of which is shown at 13 in FIGS. 2 and 3) or the like. The implement 11 includes, in general, a plurality of elongated tube members 15, a scoop means 17, a plurality of elongated screw means 19, a plurality of elongated burner means 21, a frame means 23, and a plurality of wheel members 25.

Each tube member 15 is hollow and has an opened first end 27 and an opened second end 29 (see, in general, FIGS. 4 and 5). Additionally, each of the tube members 15 has an elongated combustion chamber 31 and an elongated conveyor chamber 33 extending the entire length thereof. The conveyor chamber 33 has a longitudinal axis as indicated by the points A—A in FIG. 3. The conveyor chamber 33 is preferably substantially larger than the combustion chamber 31 in cross sectional area. The combustion chamber 31 is preferably located directly above the upper most portion of the conveyor chamber 33 and directly communicates therewith. The tube members 15 are constructed of a substantially rigid material such as metal in any manner apparent to those skilled in the pipe and tube manufacture art. The tube members 15 are preferably fixedly supported by the frame means 23 in a side by side, substantially contiguous manner with the longitudinal lengths thereof aligned with the direction of movement of the implement 11. The tube member 15 may be supported by the frame means 23 in any manner apparent to those skilled in the art. For example, the tube members 15 may be welded to a base member 37 of the frame means 23. The wheel members 25 may also be mounted on the base member 37 by appropriate support structure 38 (see, in general, FIG. 3). The wheel members 25 are preferably mounted on the base member 37 so that the longitudinal axis A—A of the conveyor chambers 33 is below the height of the center axis of the wheel members 25 as shown schematically by the line B—B in FIG. 3.

The scoop means 17 is preferably located adjacent the first end 27 of each tube member 15 (see, in general, FIG. 4). The scoop means 17 preferably consists of a downwardly angled blade member 39 attached to the base member 37 of the frame means 23 adjacent the first end 27 of the tube members 15 for digging soil from the ground as the implement 11 is moved thereover and for directing the soil into the first ends 27 of the tube members 15. The blade member 39 preferably has a sharpened cutting edge 41 for allowing it to easily dig into the soil. The blade member 39 is preferably constructed of a rigid material such as metal and may be attached to the base member 37 of the frame means 23 in any manner apparent to those skilled in the art such as by welding or the like.

Each screw means 19 preferably includes an elongated shaft-like member 43 having an endless ridge 45 in the form of a helix extending substantially the entire length of the external surface thereof and supported within the conveyor chamber 33 of each tube member 15 by appropriate support structure 47 (see, in general, FIGS. 4 and 5) in a manner which will not block the flow of soil through the conveyor chambers 33. Appropriate mechanical connection between the shaft-like member 43 and a power source PS such as the typical power take-off of a tractor, or the wheels 25, etc., through appropriate mechanical connections (see FIG. 4) causes the screw means 19 to rotate. Rotation of the screw means 19 will cause the soil directed into the first ends 27 of the tube members 15 to be fed completely through the tube members 15 and out the second ends 29 thereof as will now be apparent to those skilled in the art.

The burner means 21 preferably includes an elongated burner element 49 supported within the combustion chamber 31 of each tube member 15 by appropriate support structure 51 (see, in general, FIGS. 4 and 5) and having a plurality of downwardly directed orifices 53 therein. Each burner element 49 is coupled to a tank 55 of butane gas or the like by way of appropriate tube 57 or the like. The burner means 21 will allow a flame to be directed against the soil being moved through the conveyor chamber 33 of each tube member 15 by the screw means 19 along the entire length of each tube member 15.

The implement 11 may include a feed means 59 for aiding the scoop means 17 in feeding soil into the first end 27 of each tube member 15 (see, in general, FIG. 4). The feed means 59 preferably includes a paddle wheel member 61 supported adjacent the first end 27 of the tube members 59 and the scoop means 17 by appropriate support structure 63. The paddle wheel member 61 is rotatably driven in the direction indicated by the arrow 65 in FIG. 4 in any manner apparent to those skilled in the art to aid in feeding dirt onto and from the bladelike member 39 into the first end 27 of each tube member 15. The paddle wheel member 61 may be rotatably driven by way of a power source PS such as the typical power-take-off of the tractor pulling the implement 11, or by the wheels 25, etc., through appropriate mechanical connections (see FIG. 4).

The implement 11 may include a skirt means 67 located adjacent the second end 29 of each tube member 15 for directing soil from the second end 29 of each tube member 15 to the ground (see, in general, FIG. 5). The skirt means 67 may consist simply of a downwardly directed tail member 69 attached to and extending completely across the rearward end of the base member 37 of the frame means 23. The tail member 69 is preferably constructed of a substantially rigid material such as metal and may be fixedly attached to the base member 27 in any manner apparent to those skilled in the art such as by being welded thereto.

The implement 11 may include a slide means 71 for aid in controlling the depth to which the scoop means 71 will dig (see, in general, FIG. 4). The slide means 71 may consist simply of a shoe member 73 attached to the underneath side of the bladelike member 39 and/or base member 37 in any manner apparent to those skilled in the art such as by being welded thereto. The shoe member 73 may be adjustable to allow the depth of cut of the scoop means 17 to be varied.

The operation of the implement 11 is quite simple. The implement 11 is first attached to a tractor or the like by way of a three-point hitch mechanism 13 or the like. The implement 11 is then pulled to the site where the soil is to be flame treated and the scoop means 17 is then lowered onto the ground by way of the three-point hitch mechanism whereby forward movement of the implement 11 will cause the paddle wheel member 61 and the blade 39 to dig soil from the ground. The scoop means 17 and feed means 59 will then coact to feed the soil into the first end 27 of the tube members 15. The screw means 19 will then cause soil to pass completely through the conveyor chamber 33 of the tube members 15. As the soil is passing through the conveyor chambers 33, the burner means 21 will subject the soil to flames thereby ridding the soil of insects, nematodes, grass, weeds, seeds, etc. The flame treated soil is then feed out the second end 29 of the tube members 15, over the skirt means 67 and back onto the ground.

Although the present invention has been described and illustrated with respect to a preferred embodiment thereof and a preferred use therefore, it is not to be so limited since changes and modifications can be made therein which are within the full intended scope of the invention.

I claim:

1. An implement for movement over the ground and for flame treating soil from the ground, said implement comprising:
   (a) an elongated tube member having an opened first end and an opened second end, said tube member having an elongated combustion chamber and an elongated conveyor chamber, said combustion chamber being located above and in communication with said conveyor chamber;
   (b) scoop means located adjacent said first end of said tube member for digging soil from the ground as said implement is moved thereover and for directing the soil into said first end of said tube member;
   (c) a single elongated screw means for being mounted in said conveyor chamber of said tube member and for moving the soil from said first end of said tube member completely through said tube member and out said second end thereof; and
   (d) an elongated burner means for being mounted in said combustion chamber of said tube member and for subjecting the soil moving through said tube member to flame substantially along the entire length of said tube member, said burner means including an elongated burner element supported within said combustion chamber of said tube member and having a plurality of downwardly directed orifices therein.

2. The implement of claim 1 in which is included a frame means for securing said tube member, scoop means, screw means and burner means with respect to one another; and in which is included a plurality of wheel members for rollably supporting said frame means above the ground.

3. The implement of claim 2 in which is included feed means for coacting with said scoop means in directing the soil into said first end of said tube member.

4. The implement of claim 3 in which said feed means includes a power-driven paddle-wheel member mounted above said scoop means.

5. The implement of claim 4 in which is included skirt means located adjacent said second end of said tube member for directing soil from said second end of said tube member to the ground.

6. The implement of claim 5 in which the center axis of said wheel members is higher than the longitudinal axis of said conveyor chamber of said tube member.

7. The implement of claim 6 in which is include a plurality of tube members, screw means and burner means.

8. An agricultural implement for being attached to and pulled by a tractor and for flame treating soil to help sterilize the soil, said implement comprising:
(a) a plurality of elongated tube members, each of said tube members being hollow and having an opened first end and an opened second end, each of said tube members having an elongated combustion chamber and an elongated conveyor chamber extending the entire length thereof, each of said conveyor chambers having a longitudinal axis;
(b) scoop means located adjacent said first ends of said tube members for digging soil from the ground as said implement is moved thereover and for directing the soil into said first ends of said tube members;
(c) skirt means located adjacent said second ends of said tube members for directing soil from said second ends of said tube members to the ground;
(d) a single elongated screw means for being mounted in said conveyor chamber of each of said tube members and for causing the soil directed into said first ends of said tube members to pass completely through said tube members and out said second ends thereof;
(e) elongated burner means for being mounted in said combustion chamber of each of said tube members and for subjecting the soil to flame along the entire length of said tube members, each of said burner means including an elongated burner element supported within said combustion chamber of each of said tube members and having a plurality of downwardly directed orifices therein;
(f) frame means for securing said tube members, scoop means, skirt means, screw means and burner means with respect to one another; and
(g) a plurality of wheel members for rollably supporting said frame means above the ground, each of said wheel members having a center axis, said longitudinal axis of each of said conveyor chambers being located below said center axis of said wheel members.

9. The implement of claim 8 in which said scoop means includes a downwardly angled blade member having a sharpened cutting edge.

10. The implement of claim 9 in which is included a slide means for aid in controlling the depth to which said scoop means will dig.

* * * * *